United States Patent
Resch

(10) Patent No.: US 8,943,815 B2
(45) Date of Patent: Feb. 3, 2015

(54) HEAT EXCHANGER

(71) Applicant: Eberspacher Exhaust Technology GmbH & Co. KG, Neunkirchen (DE)

(72) Inventor: Andreas Resch, Essligen (DE)

(73) Assignee: Eberspacher Exhaust Technology GmbH & Co. KG, Neunkirchen (DE)

( * ) Notice: Subject to any disclaimer, the term of this patent is extended or adjusted under 35 U.S.C. 154(b) by 17 days.

(21) Appl. No.: 13/897,179

(22) Filed: May 17, 2013

(65) Prior Publication Data
US 2013/0333359 A1    Dec. 19, 2013

(30) Foreign Application Priority Data
May 18, 2012   (DE) .................. 10 2012 208 354

(51) Int. Cl.
*F01N 3/00*     (2006.01)
(Continued)

(52) U.S. Cl.
CPC ............... *F25B 21/02* (2013.01); *F01N 5/025* (2013.01); *F28F 1/40* (2013.01); *F28F 13/14* (2013.01); *F28D 7/0025* (2013.01); *F28D 7/1684* (2013.01); *F28D 21/0003* (2013.01); *F01N 5/02* (2013.01); *F01N 13/18* (2013.01); *F28F 2215/04* (2013.01); *F01N 2240/02* (2013.01); *Y02T 10/16* (2013.01)
USPC ............................. 60/320; 60/324; 136/205

(58) Field of Classification Search
USPC ..................... 60/320, 324; 136/205
See application file for complete search history.

(56) References Cited

U.S. PATENT DOCUMENTS 2,246,329 A      6/1939  Telkes
5,974,803 A *  11/1999  Hammerschmid ............. 60/643
(Continued)

FOREIGN PATENT DOCUMENTS

DE          1828136 U       3/1961
DE    102004057407 A1       8/2005
(Continued)

OTHER PUBLICATIONS

Office Action for corresponding German Patent Application No. 10 2012 208 354.5 mailed Jan. 23, 2013.

*Primary Examiner* — Thomas Denion
*Assistant Examiner* — Dapinder Singh
(74) *Attorney, Agent, or Firm* — James P. Muraff; Neal, Gerber & Eisenberg LLP

(57) ABSTRACT

A heat exchanger is provided for an exhaust system of an internal combustion engine. The exchanger has a thermoelectric generator which comprises a hot side and a cold side with a heating pipe arranged on one hot side of the thermoelectric generator, and with a cooling pipe arranged on one cold side of the thermoelectric generator. The thermoelectric generator the heating pipe, and the cooling pipe are stacked in a stack direction on top of one another and form a pipe stack, in which the respective thermoelectric generator, heating pipe and cold pipe extend parallel to one another in a longitudinal direction of the pipe stack. An increased energetic efficiency is obtained. A heat transfer structure has a heat transfer capability favoring a heat transfer between the respective pipe and the respective media conducted therein.

10 Claims, 4 Drawing Sheets

Figure 1:
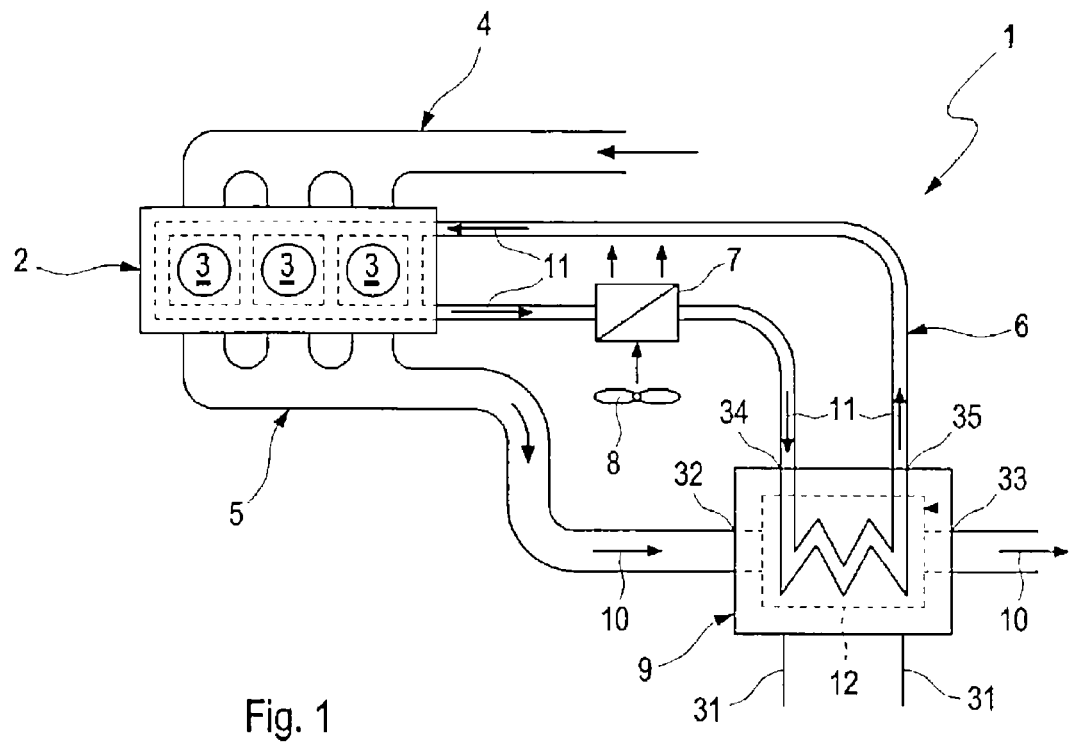

(51) Int. Cl.

| | | |
|---|---|---|
| F01N 3/02 | (2006.01) | |
| *F01N 3/10* | (2006.01) | |
| *F01N 3/20* | (2006.01) | |
| *H01H 35/30* | (2006.01) | |
| *F25B 21/02* | (2006.01) | |
| *F01N 5/02* | (2006.01) | |
| *F28F 1/40* | (2006.01) | |
| *F28F 13/14* | (2006.01) | |
| *F28D 7/00* | (2006.01) | |
| *F28D 7/16* | (2006.01) | |
| *F28D 21/00* | (2006.01) | |
| *F01N 13/18* | (2010.01) | |

(56) References Cited

U.S. PATENT DOCUMENTS

| | | | |
|---|---|---|---|
| 7,756,404 B2 * | 7/2010 | Schubert et al. | 392/478 |
| 7,921,640 B2 * | 4/2011 | Major | 60/320 |
| 2010/0186399 A1 * | 7/2010 | Huttinger | 60/320 |
| 2011/0308560 A1 * | 12/2011 | Arbuckle et al. | 136/205 |
| 2012/0073276 A1 * | 3/2012 | Meisner et al. | 60/320 |

FOREIGN PATENT DOCUMENTS

| | | |
|---|---|---|
| DE | 102007063172 A1 | 7/2009 |
| DE | 102009037179 A1 | 2/2011 |
| JP | 2001012240 A | 1/2001 |

* cited by examiner

HEAT EXCHANGER

CROSS-REFERENCE TO RELATED APPLICATION

This application claims priority to German Patent Application DE 10 2012 208 354.5, filed on May 18, 2012, entitled HEAT EXCHANGER which is incorporated by reference in its entirety.

The present invention relates to a heat exchanger, in particular for an exhaust system of an internal combustion engine, preferentially in a motor vehicle. The present invention additionally relates to an internal combustion engine, in particular in a motor vehicle, which is equipped with at least one such heat exchanger.

In order to improve the energetic efficiency of internal combustion engines, in particular in vehicle applications, it is possible to utilise heat energy which is contained in the exhaust gas of the internal combustion engine. To this end, heat exchangers can be used in order to transfer the heat from the exhaust gas, which then serves as a heating medium, into a coolant, in order to thereby heat a passenger interior space or in order to evaporate the coolant, which then serves as a working medium, within a Rankine cycle. Furthermore, the heat contained in the exhaust gas can be converted into electric energy with the help of thermoelectric generators. For this purpose, heat exchangers of the type mentioned at the outset are employed, which comprise at least one thermoelectric generator, which has a hot side and a cold side. Furthermore, such a heat exchanger comprises at least one heating pipe for conducting a heating medium, which is arranged on at least one hot side of such a thermoelectric generator, and at least one cooling pipe for conducting a coolant, which is arranged on at least one cold side of such a thermoelectric generator. Here it can be practically provided that within the heat exchanger, the at least one thermoelectric generator, the at least one heating pipe and the at least one cooling pipe are stacked on top of one another in a stacking direction thus forming a pipe stack, in which the respective thermoelectric generator, the respective heating pipe and the respective cooling pipe extend parallel to one another in a longitudinal direction of the pipe stack.

The present invention deals with the problem of stating an improved or at least another embodiment for such a heat exchanger, which contains at least one thermoelectric generator, which embodiment is characterized in particular by an increased energetic efficiency.

According to the invention, this problem is solved in particular through the subject of the independent claim. Advantageous embodiments are subject of the dependent claims.

From DE 10 2009 037 179 A1 it is known in principle to configure the heat flow from the respective heating pipe to the respective cold pipe through the respective thermoelectric generator in the longitudinal direction of the pipe stack preferably constant, although in the longitudinal direction of the pipe stack the temperature differential between the respective heating pipe and the respective cold pipe varies because of the heat flow in the longitudinal direction of the pipe stack. For example, when connecting the heating pipes and the cooling pipes according to the parallel flow principle, the temperature differential significantly diminishes in the longitudinal direction of the pipe stack. Even when connected according to the counterflow principle, a decrease of the temperature differential in the longitudinal direction of the pipe stack can be observed as a rule, but which can be less than with a flow according to the parallel flow principle. DE 10 2009 037 179 A1 now utilises this knowledge and takes into account the temperature differential which decreases in the longitudinal direction of the pipe stack in that corresponding to this an increase of the heat transfer capability or a decrease of the heat transfer resistance is created in the longitudinal direction of the pipe stack. In the ideal case, the change of the temperature differential which materialises in the longitudinal direction of the pipe stack and the change of the heat transfer capability specifically included in the design of the heat exchanger in this pipe stack longitudinal direction are so matched to one another for the respective predetermined operating state of the heat exchanger and the internal combustion engine equipped with said heat exchanger, so that along the longitudinal direction of the pipe stack the heat flow remains largely constant. With decreasing temperature differential, the heat transfer capability has to be increased since the temperature differential represents the potential or the drive of the heat flow.

In order to obtain all regions with different heat transfer capability, rib-like fins in different quantity or density are arranged on the wall regions according to DE 10 2009 037 179 A1. This involves a major manufacturing effort. This effort is to be substantially reduced with the invention.

According to the invention, the heat transfer structure is formed as a rib structure in the form of a wavy or corrugated sheet-like or pleated wall, wherein the waves can have a small wave length with a relatively large wave amplitude. The variation of the heat transfer capability can be effected by changing the wave form, in particular by changing the wave length and/or wave amplitude, but also by changing the wall thickness.

In order to perform the general basic idea of the present invention sketched above in the heat exchanger, it can be provided according to an advantageous solution to arrange a heat transfer structure in at least one of the pipes, which has a heat transfer capability which favours a heat transfer between the respective pipe and the respective medium conducted therein. In addition to this it is proposed to configure at least one such heat transfer structure so that its heat transfer capability varies in the longitudinal direction of the pipe stack. In other words, the heat transfer capability, which in addition to the temperature differential is responsible for the heat flow, is specifically influenced with the help of a heat transfer structure, in order to be thus able to realise the desired course of the heat transfer capability along the pipe stack longitudinal direction. Such heat transfer structures can either be arranged only in the heating pipes or only in the cooling pipes or both in the heating pipes as well as in the cooling pipes. By influencing the heat transfer capability with the help of such heat transfer structures it is possible in particular to use conventional pipes for the heating pipes or cooling pipes, which are characterized in particular through cross sections which are constant in the pipe stack longitudinal direction. Because of this, the heat exchanger can be realised in a particularly cost-effective manner.

According to an advantageous embodiment, the heat transfer capability of a heat transfer structure arranged in a heating pipe can increase in the flow direction of the heating medium. Because of this, a temperature decrease of the heating medium in the flow direction can be offset through an increasing heat transfer capability. Additionally or alternatively it can be provided that the heat transfer capability of a heat transfer structure arranged in a cooling pipe decreases in the flow direction of the cooling medium. The temperature of the cooling medium increases in the flow direction, which can be offset through a reduction of the heat transfer capability.

In another advantageous embodiment it can be provided that the heat transfer capability is continuously varied in the longitudinal direction of the pipe stack. Because of this, a particularly homogeneous equalisation of the heat flow along the pipe stack longitudinal direction can be achieved.

Alternatively, an embodiment is also possible in which the heat transfer capability varies the longitudinal direction of the pipe stack discontinuously, i.e. in particular in a stepped manner. With a discontinuous variation of the heat transfer capability it can be taken into account for example that a single thermoelectric generator usually consists of a plurality of thermoelectric elements arranged in the pipe stack longitudinal direction one after the other, wherein within the respective thermoelectric element heat is converted into electricity. Thus, along such a thermoelectric generator, a stepped temperature decrease in the heating medium or temperature increase in the cooling medium can also be observed. By taking into account this stepped temperature change through a correspondingly stepped variation of the heat transfer capability, the energetic efficiency of the heat exchanger can likewise be improved.

A discontinuity of the heat transfer capability in the longitudinal direction or in the transverse direction of the heat conducting structure can for example be realised in that for producing the heat transfer structure a metal sheet is used which is configured as a tailored blank. Here, the metal sheet is assembled in the longitudinal direction or in the transverse direction of the heat transfer structure from at least two different metal sheets, which differ from each other through different materials having different heat transfer coefficients.

According to another advantageous embodiment, at least one such heat transfer structure can be formed through a rib structure, which comprises ribs extending in the longitudinal direction of the pipe stack. Such a rib structure is characterized by a particularly low flow resistance, but nevertheless has comparatively large surfaces which are available for the heat transfer. To produce such a rib structure, a metal sheet configured for example as a tailored blank of the type described above can be used in order to achieve the desired variation of the heat transfer capability.

Additionally or alternatively, longitudinal portions of the rib structure having different heat transfer capabilities can differ from one another according to a practical further development through different rib quantities and/or rib wall thickness and/or rib density and/or rib geometry. Likewise, such a longitudinal portion can be realised in a single layer, while a further longitudinal portion can be configured in two or multiple layers.

Alternatively to this it is likewise possible to vary an area component of an internal cross-sectional area of the respective pipe filled out by the rib structure in the longitudinal direction of the rib structure. The rib structure itself can otherwise be designed constant or even in shape in the pipe stack longitudinal direction. For example, the rib structure can be cut wedge-like in the longitudinal direction of the pipe stack, so that in the pipe stack longitudinal direction with otherwise constant rib density and rib geometry the quantity of the present ribs increases or depending on the viewing direction, decreases.

In another alternative embodiment it can be provided that the rib structure comprises at least two segments which are adjacent in the longitudinal direction of the pipe stack, which differ from one another through different rib quantity and/or rib wall thickness and/or rib density and/or rib geometry and/or number of layers. Instead of a continuous, one-piece rib structure, a segmented rib structure is thus proposed for this case, which has differently configured segments, wherein within the respective segment the abovementioned parameters are practically constant.

In a further embodiment it can be provided that the rib structure continuously, i.e. without interruption extends in the pipe stack longitudinal direction and has an outer cross section which is constant in the longitudinal direction of the pipe stack, wherein however a rib wall thickness and/or a rib geometry changes in the longitudinal direction of the pipe stack. This can be realised for example in that the rib structure is produced of a metal sheet, which in the pipe stack longitudinal direction has a varying metal sheet thickness. Alternatively to this it can be provided that in the pipe longitudinal direction a number of metal sheets located on top of one another for forming the rib structure increases or decreases. For example, the rib structure can be configured as a single layer at an onflow end, while it is two or multi-layered at its outflow end, so that the wall thickness of the rib structure, which is determined by way of the number of the metal sheets used, increases in steps in the flow direction of the respective medium.

In another advantageous embodiment, at least one such heat transfer structure can be configured so that its heat transfer capability varies transversely to the longitudinal direction of the pipe stack and transversely to the stack direction. A variation of the heat transfer capability that is symmetrical with respect to the longitudinal axis of the respective pipe is practical here. For example, the heat transfer capability continuously or discontinuously decreases or increases towards the middle.

The above configuration can be realised according to a preferred further development for example in that a rib wall thickness and/or a rib geometry varies transversely to the longitudinal direction of the pipe stack and transversely to the stack direction. Here it can be provided that the rib structure extends continuously, i.e. without interruption in the pipe stack longitudinal direction and has an outer cross section which is constant in the longitudinal direction of the pipe stack. This configuration can for example also be realised in that the rib structure is produced of a metal sheet, which has a varying metal sheet thickness transversely to the pipe stack longitudinal direction. Alternatively to this it can be provided that transversely to the pipe longitudinal direction a number of metal sheets lying on top of one another for forming the rib structure increases or decreases. For example, the rib structure can be configured as a single layer at both of its lateral ends, while in the middle it has two or multiple layers, so that the wall thickness of the rib structure which is determined by way of the number of the metal sheets used, increases and decreases again in a stepped manner transversely to the flow direction of the respective medium.

In another embodiment, the respective thermoelectric generator can comprise a plurality of separate thermoelectric elements, which are electrically interconnected and which are arranged next to one another in the longitudinal direction of the pipe stack. Furthermore, the heat exchanger practically comprises a plurality of heating pipes and a plurality of cooling pipes, which alternate in the stack direction with thermoelectric generators located in between. Adapting the heat transfer structures can thus vary dependent on the position of the respective pipe with the pipe stack and dependent on the number and distribution of the thermoelectric elements within the same heat exchanger.

An internal combustion engine according to the invention, which in particular is employed in a motor vehicle, comprises an engine block having a plurality of combustion chambers, an exhaust system for discharging combustion exhaust gas from the combustion chambers, a cooling circuit for cooling the engine block and at least one heat exchanger of the type described above. Here, the at least one heating pipe of the heat exchanger is fluidically coupled to the exhaust system, while the at least one cooling pipe of the heat exchanger is fluidically coupled to the cooling circuit.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters refer to same or similar of functionally same components.

Figure 2:
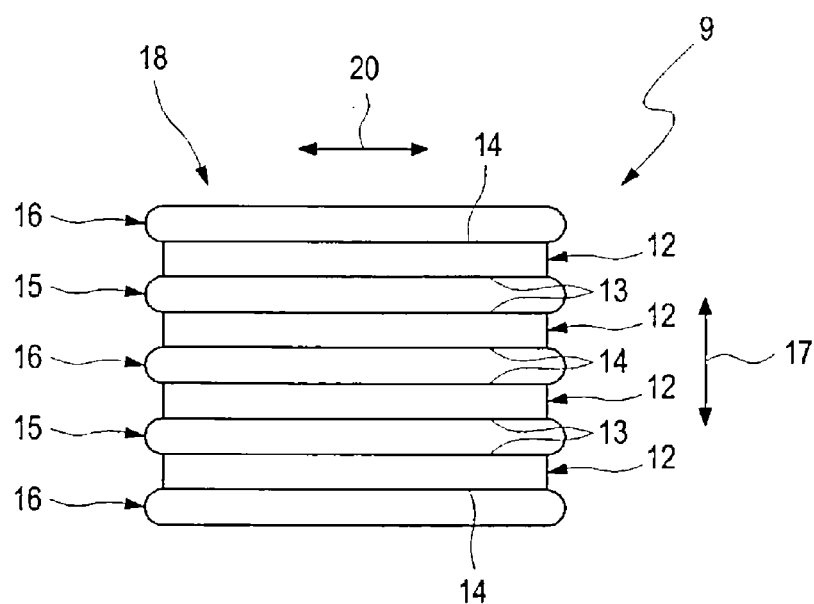
Figure 3:
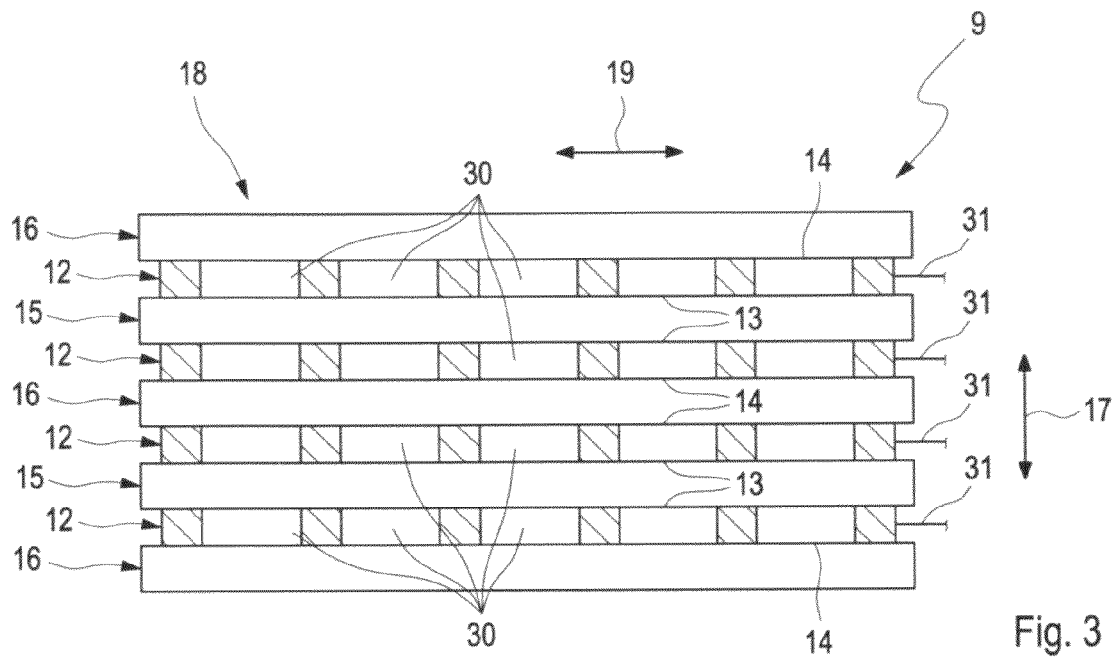
Figure 4:
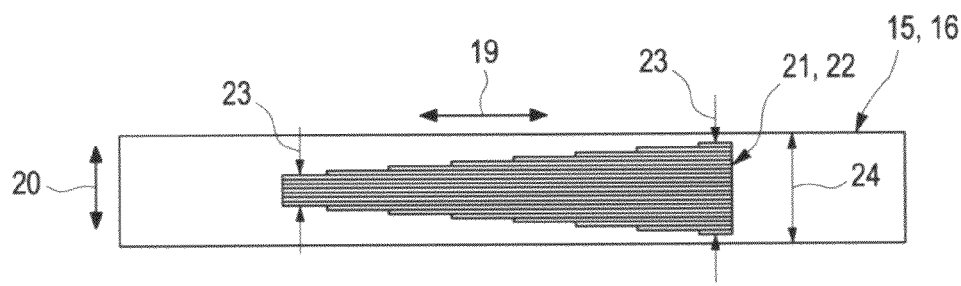
Figure 5:
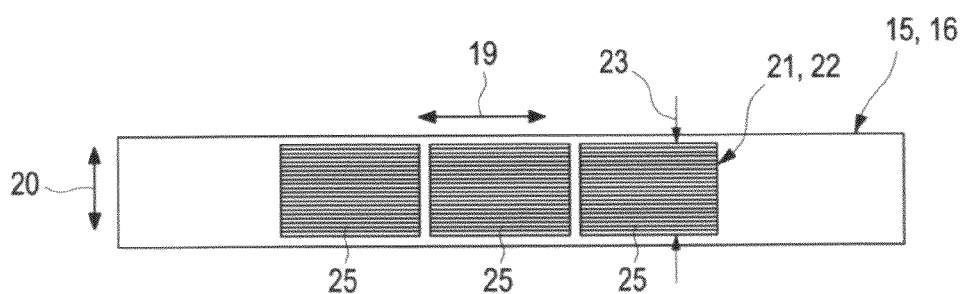
Figure 6:
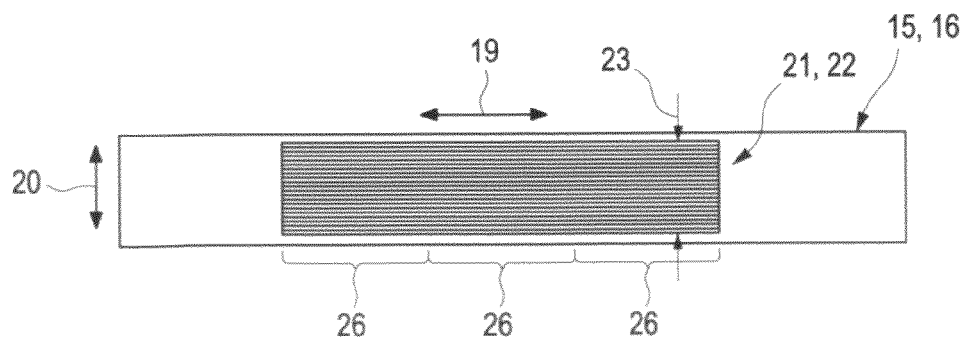
Figure 7:
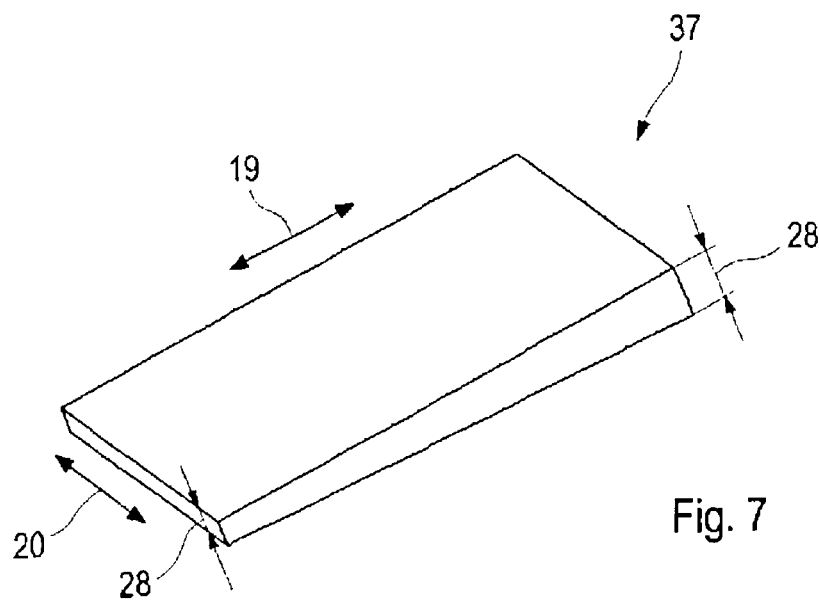
Figure 8:
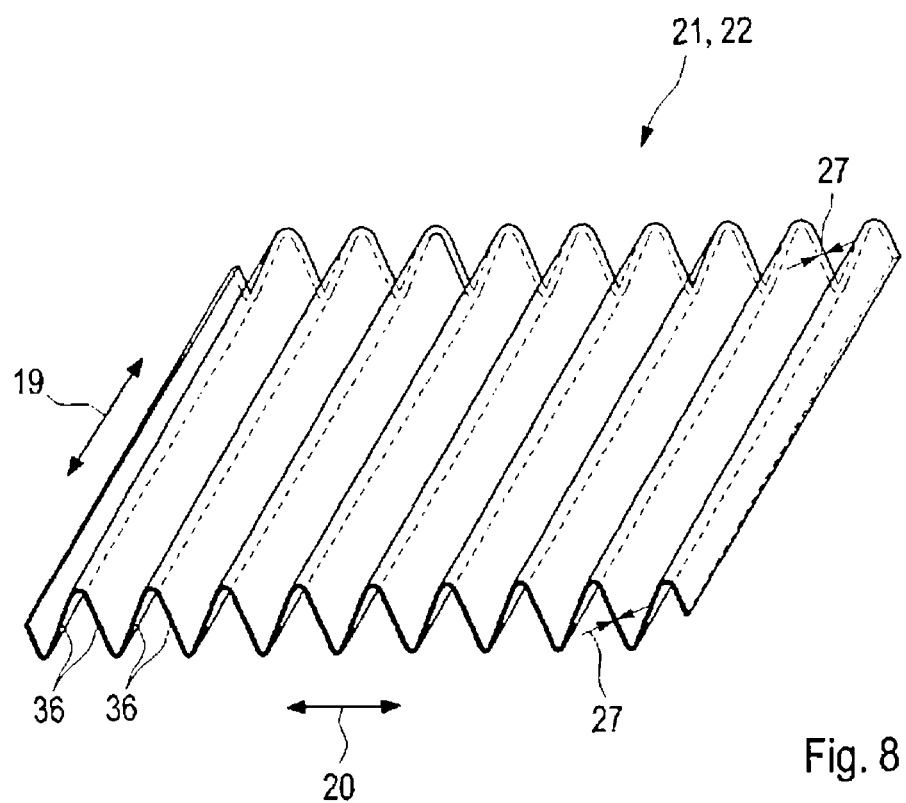
Figure 9:
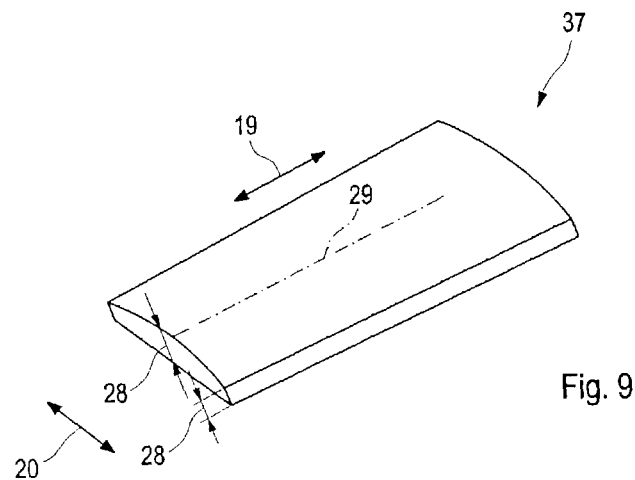
Figure 10:
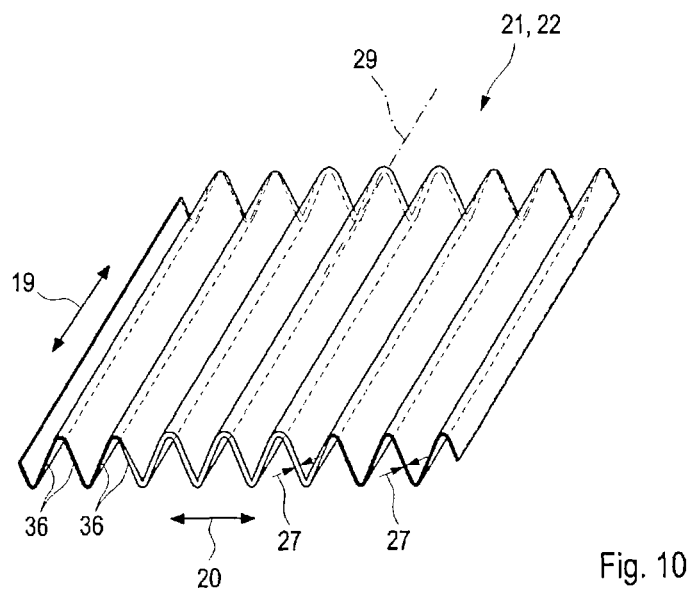

It shows, in each case schematically,

FIG. 1 a highly simplified circuit diagram-like representation of an internal combustion engine, FIG. 2 a highly simplified schematic cross section of a heat exchanger, FIG. 3 a simplified lateral view of the heat exchanger, FIG. 4 to 6 a longitudinal section each through a pipe of the heat exchanger in a top view with different embodiments, FIG. 7 a highly simplified isometric view of a metal sheet for producing a heat transfer structure according to FIG. 8, FIG. 8 a simplified isometric view of a detail of a further heat transfer structure, FIG. 9 a view as in FIG. 7, however with another metal sheet for producing a heat transfer structure according to FIG. 10, FIG. 10 a view as in FIG. 8, however with another heat transfer structure.

According to FIG. 1, an internal combustion engine 1, which can in particular be arranged in a motor vehicle, comprises an engine block 2, containing a plurality of combustion chambers 3, in which combustion reactions exhaust gas is generated. A fresh air system 4 supplies the combustion chambers 3 with fresh air. An exhaust system 5 discharges the exhaust gas 10 from the combustion chambers 3. The internal combustion engine 1 is furthermore equipped with a cooling circuit 6, in which a coolant 11 circulates and with the help of which the engine block 2 can be cooled. In the usual manner, an engine radiator 7 is incorporated in the cooling circuit 6 in this case, which for example can be actively subjected to a through-flow of ambient air with the help of a blower 8. The internal combustion engine 1 introduced here is additionally equipped with a heat exchanger 9, which on the one side is fluidically incorporated in the exhaust system 5 and on the other side fluidically incorporated in the cooling circuit 6 in such a manner that a heat transfer between the exhaust gas of the exhaust system 5 serving as heating medium 10 and the coolant 11 of the cooling circuit 6 can be realised.

According to FIG. 1, the heat exchanger 9 comprises a heating medium inlet 32, a heating medium outlet 33, a cooling medium inlet 34 and a cooling medium outlet 35. The flow direction of the heating medium 10 leads from the heating medium inlet 32 to the heating medium outlet 33. The flow direction of the cooling medium 11 leads from the cooling medium inlet 34 to the cooling medium outlet 35.

Such a heat exchanger 9 according to FIGS. 2 and 3 comprises at least one thermoelectric generator 12. In the embodiment shown in FIGS. 2 and 3, the heat exchanger 9 comprises four such thermoelectric generators 12 purely for exemplary purposes. The respective thermoelectric generator 12 in this case has a hot side 13 and a cold side 14 each. In addition, the heat exchanger 9 comprises at least one heating pipe 15. In the shown example, two such heating pipes 15 are provided. The respective heating pipe 15 serves for conducting the heating medium 10 and is arranged on at least one hot side 13 each of such a thermoelectric generator 12. In the shown example, each heating pipe 15 is arranged on two hot sides 13 facing each other of two adjacent thermoelectric generators 12. Finally, the heat exchanger 9 additionally comprises at least one cooling pipe 16. In the shown example, three such cooling tubes 16 are provided, namely two outer cooling pipes 16 and a middle cooling pipe 16. The respective cooling pipe 16 serves for conducting the coolant 11 and in this case is arranged on at least one cold side 14 of at least one such thermoelectric generator 12. In the example, the two outer cooling pipes 16 each of a cold side 14 of a thermoelectric generator 12 are arranged. In contrast with this, the middle cooling pipe 16 is arranged on two cold sides 14 located opposite each other of two adjacent thermoelectric generators 12.

According to FIG. 3, the respective thermoelectric generator 12 is assembled in the usual manner from a plurality of separate thermoelectric elements 30, which are arranged one after the other in the longitudinal direction 19 and which are electrically interconnected in a suitable manner. Corresponding electrical connections 31 are led out of the heat exchanger 9, as a result of which the electric current won from the heat of the exhaust gas 10 can be discharged.

The thermoelectric generators 12, the heating pipes 15 and the cooling pipes 16 are stacked on top of one another in a stack direction 17, thus forming a pipe stack 18. Within the pipe stack 18, the thermoelectric generators 12, the heating pipes 15 and the cooling pipes 16 extend parallel to one another and thereby define a longitudinal direction 19 of the pipe stack 18. In FIG. 2, a transverse direction 20 of the pipe stack 18 is additionally indicated, which extends transversely to the stack direction 17 and transversely to the longitudinal direction 19.

According to FIG. 4 to 6, a heat transfer structure 21 can be arranged in the interior of at least one of the pipes, i.e. of the heating pipes 15 and cooling pipes 16. Such a heat transfer structure 21 has a heat transfer capability which favours a heat transfer between the respective pipe 15, 16 and the respective medium 10, 11 conducted therein. The heat transfer structure 21 in this case is configured so that its heat transfer capability varies in the longitudinal direction 19. It can be provided, for example, that the heat transfer capability of the heat transfer structure 21 in a heating pipe 15 increases in the flow direction of the heating medium 10. In contrast with this, the heat transfer capability of the heat transfer structure 21 can decrease in a cooling pipe 16 in the flow direction of the cooling medium 11.

With the embodiment shown in FIG. 4, the heat transfer capability continuously varies in the longitudinal direction 19, in particular linearly. In contrast with this, FIG. 5 shows an embodiment in which the heat transfer capability varies in the longitudinal direction 19 discontinuously, in particular in a stepped manner.

As is evident in particular from FIGS. 8 and 10, the heat transfer structure 21 can be advantageously realised with the help of a rib structure 22, which is characterized by ribs 36 which extend in the longitudinal direction 19.

In the embodiment shown in FIG. 4, an area component 23 of an internal cross-sectional area 24 of the respective pipe 15, 16 filled out by the rib structure 21 can vary in the longitudinal direction 19. Here, the rib structure 21 remains constant within itself. The variance of the area component 23 in this case is achieved through a suitable, in this case wedge-like cut of the heat transfer structure 21 or the rib structure 22. In the example of FIG. 4, the rib structure 22 is substantially configured trapezium-shaped.

In the embodiment shown in FIG. 5, the variants of the heat transfer capability is achieved through a segmenting of the rib structure 22. Purely exemplarily, three segments 25 are reflected, which differ through different heat transfer capabilities. This is achieved in particular in that adjacent segments 25 differ from one another through different rib quantity and/or different rib wall thickness and/or different rib density, and/or different rib geometry and/or different metal sheet layer numbers.

In the embodiment shown in FIG. 6, the rib structure 22 extends continuously or without interruption in the longitudinal direction 19 and additionally comprises an area component 23 which remains constant in the longitudinal direction, so that here, too, an outer cross section which is constant in the longitudinal direction 19 is obtained. Nevertheless, the rib structure 22 can have a plurality of longitudinal portions 26 in the longitudinal direction 19, which differ from one another through different heat transfer capabilities. For example, the rib structure 22 can be realised with the help of so-called tailored blanks, i.e. metal sheets assembled from different metal sheets of different materials, which differ from one another through different heat transfer coefficients. In this way, different heat transfer capabilities can be realised within the rib structure 22.

In the individual segments 25 shown in FIG. 5, the area component 23 and thus the outer cross section of the rib structure 22 remains the same.

FIG. 8 shows a further embodiment, in which the rib structure 22 or the heat transfer structure 21 are configured without interruption or continuous in the longitudinal direction 19. A varying heat transfer capability in the longitudinal direction 19 in this case is realised through a rib wall thickness 27 that varies in the longitudinal direction 19. Thus, the wall thickness 27 at an end facing the beholder is smaller than at an end of the rib structure 22 facing away from the beholder in FIG. 8. This is achieved through the use of a metal sheet 37 shown in FIG. 7, in which a metal sheet thickness 28 varies in the longitudinal direction 19. In the example of FIG. 7, the metal sheet thickness 28 at a longitudinal end shown on the left in FIG. 7 is clearly smaller than at a longitudinal end of the metal sheet 37 shown in FIG. 7 on the right. This can be achieved for example by producing the rib structure 22 with the help of so-called tailored blanks, i.e. metal sheets 37, which are assembled from different metal sheets having varying metal sheet thicknesses. In this way, different rib wall thicknesses 27 can be realised within the rib structure 22. The use of tailored blanks additionally makes possible using different materials, which can differ from one another in particular through different heat transfer coefficients.

FIG. 10 shows a further embodiment which can be employed as an option in addition to the embodiments mentioned above, in which the heat transfer structure 21 or in this case the rib structure 22 is configured so that the heat transfer capability varies in the transverse direction 20. It can be provided that the rib wall thickness 27 along the rib structure 22 varies in the transverse direction 20. In the example of FIG. 10, the rib wall thickness 27 increases from the marginal sides located outside in the direction of the middle. A longitudinal centre axis 29 of the rib structure 22 in this case defines its middle. This is achieved by using a metal sheet 37 shown in FIG. 9, the metal sheet thickness 28 of which decreases starting from the longitudinal centre axis 29 towards the outside. Practically, the metal sheet 37 and the heat transfer structure 21 are constructed mirror-symmetrically with respect to the longitudinal centre axis 29, so that in the example of FIG. 9 the metal sheet thickness 28 from the two marginal sides located outside increase towards the middle. Analogously to this, the rib wall thickness 27 in the heat transfer structure of FIG. 10 increases from the lateral outer marginal regions towards the longitudinal centre line 29. This can be achieved, for example by producing the rib structure 22 with the help of so-called tailored blanks, i.e. metal sheets 37 which are assembled from different metal sheets with varying metal sheet thickness. In this way, different rib wall thicknesses 27 can be realised within the rib structure 22. The use of tailored blanks additionally makes possible using different materials, which can in particular differ from one another through different heat transfer coefficients.

What is claimed is:

1. A heat exchanger, in particular for an exhaust system of an internal combustion engine, preferentially in a motor vehicle, comprising:
  a thermoelectric generator having a hot side and a cold side,
  a heating pipe for conducting a heating medium, which is arranged on at least one hot side of such a thermoelectric generator,
  a cooling pipe for conducting a cooling medium, which is arranged on at least one cold side of such a thermoelectric generator,
  wherein the thermoelectric generator, the heating pipe and the cooling pipe are stacked on top of one another in a stack direction and form a pipe stack, in which the respective thermoelectric generator, the respective heating pipe and the respective cold pipe extend parallel to one another in a longitudinal direction of the pipe stack,
  wherein in at least one of the pipes a heat transfer structure is arranged, which has a heat transfer capability which favours a heat transfer between the respective pipe and the respective medium conducted therein,
  wherein at least one such heat transfer structure is configured so that its heat transfer capability varies in the longitudinal direction of the pipe stack, and wherein the heat transfer structure is formed as a rib structure in the form of a wavy or corrugated sheet-like wall.

2. The heat exchanger of claim 1, wherein the heat transfer structure is formed with the help of a metal sheet configured as a tailored blank, which is assembled from at least two metal sheets which differ from one another through different heat transfer coefficients.

3. The heat exchanger of claim 1, wherein the rib structure comprises ribs extending in the longitudinal direction of the pipe stack, wherein longitudinal portions of the rib structure with different heat transfer capability differ from one another through different rib quantity and/or rib wall thickness and/or rib density and/or rib geometry and/or metal sheet quantity.

4. The heat exchanger of the claim 1, wherein the heat transfer structure is formed through a rib structure with ribs extending in the longitudinal direction of the pipe stack, wherein an area component of an inner cross-sectional area of the respective pipe filled out by the rib structure varies in the longitudinal direction of the pipe stack.

5. The heat exchanger of claim 1, wherein the heat transfer structure is formed through a rib structure with ribs extending in the longitudinal direction of the pipe stack, wherein the rib structure comprises at least two segments which are adjacent in the longitudinal direction of the pipe stack, which differ from one another through different rib quantity and/or rib wall thickness and/or rib density and/or rib geometry and/or metal sheet quantity.

6. The heat exchanger of claim 1, wherein the heat transfer structure is formed through a rib structure with ribs extending in the longitudinal direction of the pipe stack, wherein the rib structure continuously extends in the longitudinal direction of the pipe stack and has a constant outer cross section in the longitudinal direction of the pipe stack, wherein a rib wall thickness and/or a rib geometry changes in the longitudinal direction of the pipe stack.

7. The heat exchanger of claim 1, wherein the heat transfer structure is configured so that its heat transfer capability varies transversely to the longitudinal direction of the pipe stack and transversely to the stack direction.

8. The heat exchanger of claim 1, wherein the heat transfer structure is formed through a rib structure with ribs extending in the longitudinal direction of the pipe stack, wherein the rib structure continuously extends in the longitudinal direction of the pipe stack and has a constant outer cross section in the longitudinal direction of the pipe stack, wherein a rib wall thickness and/or a rib geometry changes transversely to the longitudinal direction of the pipe stack and transversely to the stack direction.

9. The heat exchanger of claim 1, characterized in that the respective thermoelectric generator comprises a plurality of separate thermoelectric elements which are electrically interconnected and which are arranged in the longitudinal direction of the pipe stack next to one another.

10. An internal combustion engine, in particular of a motor vehicle, comprising:
- an engine block, which comprises a plurality of combustion chambers,
- with an exhaust system for discharging combustion exhaust gas from the combustion chambers,
- a cooling circuit for cooling the engine block,
- the heat exchanger of claim 1, wherein the heating pipe is fluidically coupled to the exhaust system and wherein the cooling pipe is fluidically coupled to the cooling circuit.

* * * * *